No. 828,206. PATENTED AUG. 7, 1906.
R. E. HARDESTY.
VEHICLE SPRING.
APPLICATION FILED JAN. 2, 1906.
2 SHEETS—SHEET 2.
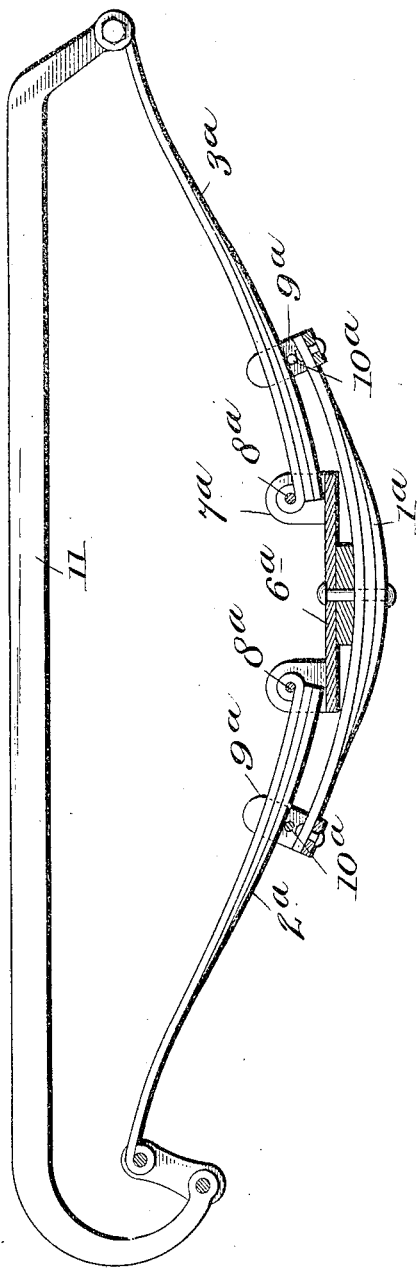
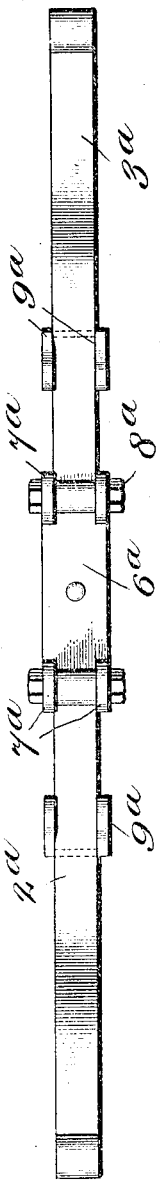
Witnesses
Inventor
R. E. Hardesty
by Wilkinson & Fisher
his Attorneys

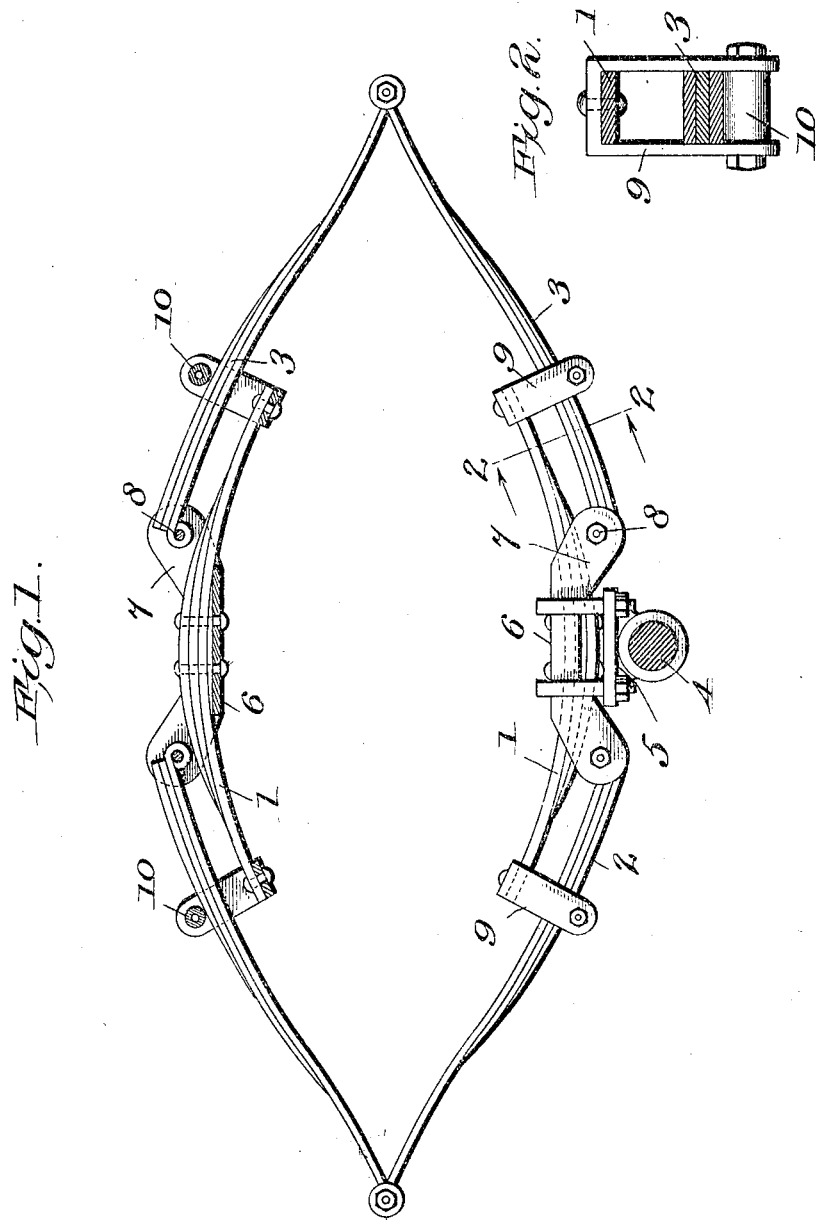

UNITED STATES PATENT OFFICE.

ROY E. HARDESTY, OF LOUISVILLE, KENTUCKY.

VEHICLE-SPRING.

No. 828,206.　　　　　Specification of Letters Patent.　　　Patented Aug. 7, 1906.

Application filed January 2, 1906. Serial No. 294,237.

*To all whom it may concern:*

Be it known that I, ROY E. HARDESTY, a citizen of the United States, residing at Louisville, in the county of Jefferson and State of Kentucky, have invented certain new and useful Improvements in Vehicle-Springs; and I do hereby declare the following to be a full, clear, and exact description of the invention, such as will enable others skilled in the art to which it appertains to make and use the same.

This invention relates to improvements in vehicle-springs, and is primarily designed to provide a spring of increased flexure and at the same time lessen the liability of breakage.

Broadly speaking, the invention consists of a sectional spring composed of a pair of main spring members joined at their inner ends to an interposed or intermediate member, the inner ends of the main spring members being pivotally connected with the interposed central member intermediate of the latter's ends and the ends of the central member yieldingly connected with its respective end member intermediate of the latter's ends.

The invention may be adapted for use with a spring of the elliptic or semi-elliptic type and may be equally as well employed as a spring extending longitudinally or transversely of the vehicle-body or the running-gear.

While the invention is not limited to the specific disclosure, for the purpose of illustration reference is had to the accompanying drawings, illustrating a practical embodiment of same, the particular features of novelty being succinctly stated in the claims.

Referring to the drawings, Figure 1 is a view in side elevation of a spring of the elliptic type embodying the invention. Fig. 2 is a detail view, in transverse section, on the line 2 2 of Fig. 1. Fig. 3 is a view in end elevation of a modified construction, the position of the sectional members being reversed relatively to each and the spring being shown as of the semi-elliptic type; and Fig. 4 is a top plan view of the spring shown in Fig. 3, the hanger-bar being omitted.

The spring members are preferably of the customary laminated form, 1 designating the central member, 2 and 3 the end members, and 4, Fig. 1, the axle of a vehicle's running-gear.

In Fig. 1 the lower section of the spring is secured to the axle in any suitable way—for instance, as shown, wherein the central member 1 is secured to the axle 4 by strap or clamping means 5. The upper section may similarly be secured to the vehicle-body. 6 designates a plate, shown in Fig. 1 as being riveted or bolted to the central member 1 and provided with ears or lugs 7, projecting outwardly beyond the outer periphery of the central spring member, it being noted that in this construction the outer periphery of the central member 1 is disposed adjacent the inner periphery of the main spring members 2 and 3, but spaced therefrom. The ears or lugs 7 are apertured, and the inner ends of the main spring members are respectively pivoted thereto, as indicated at 8. 9 designates forked members, the transverse end of each one of which is secured, as by rivets or bolts, to the ends of the central spring member 1, the forked arms having a roller 10 journaled therebetween and adapted to movably engage the outer periphery of its respective main spring member intermediate of the ends of the latter.

In the construction illustrated in Fig. 3 the arrangement is slightly different, inasmuch as the ears 7$^a$ on the plate 6$^a$ are disposed inwardly of the inner periphery of the central member 1$^a$, the inner periphery of the member 1$^a$ in this instance lying adjacent to, but spaced from, the outer periphery of the main members 2$^a$ 3$^a$. The inner ends of the main members are pivoted, as at 8$^a$, to their respective ears or lugs 7$^a$, and the outer ends of the main members are secured to the body of the vehicle in any suitable way, (indicated by the hanger-bar 11.) The roller or its equivalent, the cross-pin 10$^a$, of the forked member 9$^a$ is interposed between the cross-piece and the ends of the forked arms, the ends of the forked arms extending as guides at each edge face of the main members and the pins 10$^a$ movably engaging the outer periphery of the main members.

The operation and advantages of the improvement are obvious from the foregoing, a leverage connection being maintained between the sections of the spring, increasing the flexure thereof and lessening the liability of breakage.

It is not deemed necessary to encumber the drawings or description by illustrating a more detailed connection between the springs and the vehicle-body and running-gear, the invention residing in the spring itself.

What I claim is—

1. In an elliptic vehicle-spring, the combination of semi-elliptic sections, each section comprising a pair of main spring members, an interposed longitudinally-disposed central spring member slidingly connected at its ends to said main members to form sliding fulcrums therefor, and means pivotally connecting the inner ends of said members to said central member intermediate of the latter's ends said members forming a substantially continuous three-part spring, substantially as described.

2. The combination in a vehicle-spring, of a pair of main spring members, an interposed central spring member movably connected at its ends to said main members intermediate of the latter's ends said members forming a substantially continuous three-part spring, a pair of ears secured to said central member extending beyond the outer periphery thereof, and pivotal connections between the inner ends of said main members and said ears, substantially as described.

3. The combination in a vehicle-spring, of a pair of main spring members, an interposed central spring member, means for pivotally securing the inner ends of said main members to said central member intermediate of the latter's ends, and rollers carried by the ends of said central member and engaging said main members to form revoluble fulcrums for said main members substantially as described.

4. In an elliptic vehicle-spring, the combination of semi-elliptic sections, each section comprising a pair of main spring members, an interposed central spring member so connected at its ends to said main members intermediate of the latter's ends as to form a movable fulcrum for said main members, a pair of ears secured to said central member extending beyond the outer periphery thereof, and pivotal connections between the inner ends of said main members and said ears, substantially as described.

In testimony whereof I affix my signature in presence of two witnesses.

ROY E. HARDESTY.

Witnesses:
B. K. MARSHALL,
V. L. BRADLEY.